United States Patent [19]

Ishibashi

[11] Patent Number: 5,302,155
[45] Date of Patent: Apr. 12, 1994

[54] BICYCLE DERAILLEUR
[75] Inventor: Yasunori Ishibashi, Osaka, Japan
[73] Assignee: Maeda Industries, Ltd., Osaka, Japan
[21] Appl. No.: 949,828
[22] PCT Filed: May 11, 1992
[86] PCT No.: PCT/JP92/00603
  § 371 Date: Jan. 14, 1993
  § 102(e) Date: Jan. 14, 1993
[87] PCT Pub. No.: WO92/20567
  PCT Pub. Date: Nov. 26, 1992

[30] Foreign Application Priority Data
May 17, 1991 [JP] Japan .................. 3-142430
[51] Int. Cl.[5] .......................................... F16H 61/00
[52] U.S. Cl. .................................................. 474/82
[58] Field of Search ............................... 474/77–82, 474/69

[56] References Cited
U.S. PATENT DOCUMENTS

| | | | |
|---|---|---|---|
| 4,241,617 | 12/1980 | Nagano et al. | 474/82 |
| 4,619,633 | 10/1986 | Nagano | 474/82 |
| 4,626,229 | 12/1986 | Nagano | 474/82 |
| 4,789,379 | 12/1988 | Ozaki et al. | 474/82 |
| 5,037,355 | 8/1991 | Kobayashi | 474/82 |

FOREIGN PATENT DOCUMENTS

| | | | |
|---|---|---|---|
| 0423779 | 4/1991 | European Pat. Off. | B62K 23/04 |
| 0523257 | 9/1992 | European Pat. Off. | B62M 25/04 |
| 8536537 | 3/1986 | Fed. Rep. of Germany | B62M 25/04 |
| 53-91240 | 8/1978 | Japan . | |
| 61-12486 | 1/1986 | Japan . | |
| 63-19986 | 12/1988 | Japan . | |
| WO 9214645 | 9/1992 | PCT Int'l Appl. | B62M 25/04 |

Primary Examiner—Thuy M. Bui
Attorney, Agent, or Firm—Michael D. Bednarek

[57] ABSTRACT

With an object of decreasing the size and weight of a derailleur and a control lever assembly by decreasing a difference in an elastic returning force between a beginning and ending phases of the pantograph link mechanism's deformation, the following technical is provided: The parallelogram pantograph link mechanism (7) is provided with a first and second pivotal members (12, 13) each having a predetermined length and pivoted to a predetermined position of a different constituent member of the parallelogram pantograph link mechanism (7), and respective ends of the first and second pivotal members (12, 13) are mutually connected by a pin for causing the first and second pivotal members (12, 13) to pivot relatively to the members to which they are respectively pivoted when the parallelogram pantograph link mechanism (7) is deformed; and a return spring (15) is provided between the first or second pivotal member (12 or 13) and a selected one of the constituent members of the parallelogram pantograph (15).

9 Claims, 5 Drawing Sheets

BICYCLE DERAILLEUR

FIELD OF THE INVENTION

The present invention relates to a bicycle derailleur. More specifically the present invention relates to a bicycle derailleur wherein pulling force of a control cable is transmitted efficiently for improved speed shift operatability.

BACKGROUND ART

A bicycle derailleur, a rear derailleur for instance, has a chain guide which rotatably supports a guide pulley and a tension pulley. This chain guide is pivotally supported via a shift link mechanism such as a parallelogram pantograph link mechanism while being elastically urged in a direction to tension a chain. When a control lever, which is connected by a control cable to the shift link mechanism, is operated, the shift link mechanism is deformed to cause the chain guide, which is supported by a movable member of the shift link mechanism, to move axially of a hub shaft, forcing the chain to move to a selected sprocket of a multiple free wheel.

For the above-mentioned control cable, there is commonly employed what is known as a pull type cable wherein pulling force can only be transmitted. Therefore, the derailleur is provided with a return spring which elastically urges the shift link mechanism constantly toward the returning direction. Hence, when the control lever is turned to pull the control cable, the shift link mechanism is forced to deform in a direction where the elastic force of the return spring is accumulated. When, on the other hand, the control lever is turned otherwise to release the control cable, the accumulated force of the return spring causes the shift link mechanism to return to the original position. This movement of the shift link mechanism causes the movable member which supports the chain guide to perform a reciprocal movement corresponding to the reciprocal turning movement of the control lever.

The return spring is mounted conventionally around a pin which pivotally connects two adjacent members of the shift link mechanism. This return spring is mounted in such a way that ends of the spring elastically contact the respective constituent members of the shift link mechanism.

With this arrangement, the return spring will be contracted by an amount corresponding to a relative pivotal movement of the two members between which the ends of the return spring are placed: For instance, when these two members make a relative pivotal movement of 45°, the spring is also contracted by about 45°. According to the Hooke's law, the return spring's elastic force is proportional to its torsional deformation. This means that if the return spring receives a great amount of contraction such as described hereinabove within the shift link's deformation range, the difference in the spring's elastic force between beginning and ending phases of the shift link's deformation will also be great, posing a problem of deteriorated speed shift operatability.

To elaborate on this point, in order for the speed shift control lever to be retained at a selected rotational position, the control lever must be given a predetermined amount of friction resistance (or click resistance.) The amount of this resistance must be determined according to a maximum elastic force of the return spring. This means that as the elastic force of the return spring increases, a greater friction resistance must be provided, which results in a greater rotational resistance of the control lever with deteriorated operatability thereof. In addition, it calls for an increase in the size of a friction generating mechanism and the entire control lever assembly.

As a means to solve the above-mentioned problem, the difference in elastic force caused by the difference of the return spring's contraction may be made smaller by increasing the number of windings of the coil spring, or in other words, by increasing an overall length of the spring wire. This solution, however, will result in a very large coil spring to be used, with a decreased productivity in assembly process and an increased size and weight of the derailleur mounted with this coil spring.

DISCLOSURE OF THE INVENTION

Therefore, it is an object of the present invention to make smaller the difference in the elastic returning force between the beginning and ending phases of the shift link mechanism's deformation thereby decreasing or averaging differences in operating force required to turn the control lever at different speed shift point for improved speed shift operatability.

Another object of the present invention is to provide a bicycle derailleur wherein the derailleur and the control lever can be decreased in their size and weight.

The present invention provides a bicycle derailleur comprising: a parallelogram pantograph link mechanism including a base member mounted to a bicycle frame, a parallel pair of link members each having a base end pivoted by a connecting pin to the base member, and a movable member pivoted by connecting pins to respective free ends of the link members; and a chain guide rotatably supporting a guide pulley and a tension pulley, the chain guide being moved laterally of the bicycle by the parallelogram pantograph link mechanism for speed change operation; characterized in that:

the parallelogram pantograph link mechanism is provided with a first and second pivotal members each having a predetermined length and pivoted to a predetermined position of a different constituent member of the parallelogram pantograph link mechanism, respective free ends of the first and second pivotal members being mutually connected by a pin for causing the first and second pivotal members to pivot relative to the member to which they are pivoted when the parallelogram pantograph link mechanism is deformed; and a return spring is provided between the first or second pivotal member and a selected one of the constituent members of the parallelogram pantograph.

Other objects, features and advantages of the present invention will be fully understood from the following detailed description given with reference to the accompanying drawings.

BEST MODE FOR CARRYING OUT THE INVENTION

The best mode for carrying out the present invention will now be described in specific detail referring to the FIGS. 1 through 6.

The present embodiment is an application of the present invention to a rear derailleur 1 of a bicycle wherein a chain is shifted to a selected one of sprocket wheels on a multiple free wheel.

Figure 1:
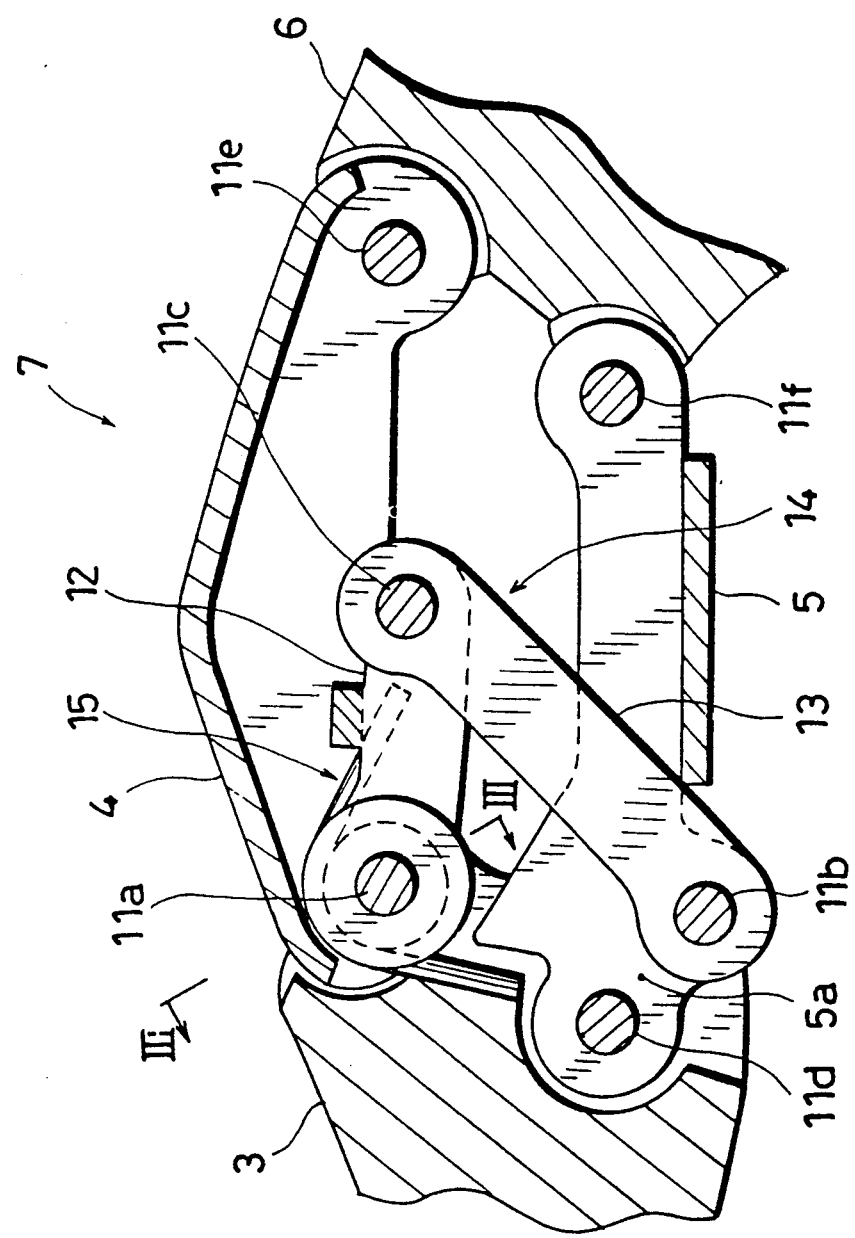
FIG. 1 is a cross-sectional view showing an embodiment of a link mechanism according to the present invention.
Figure 6:
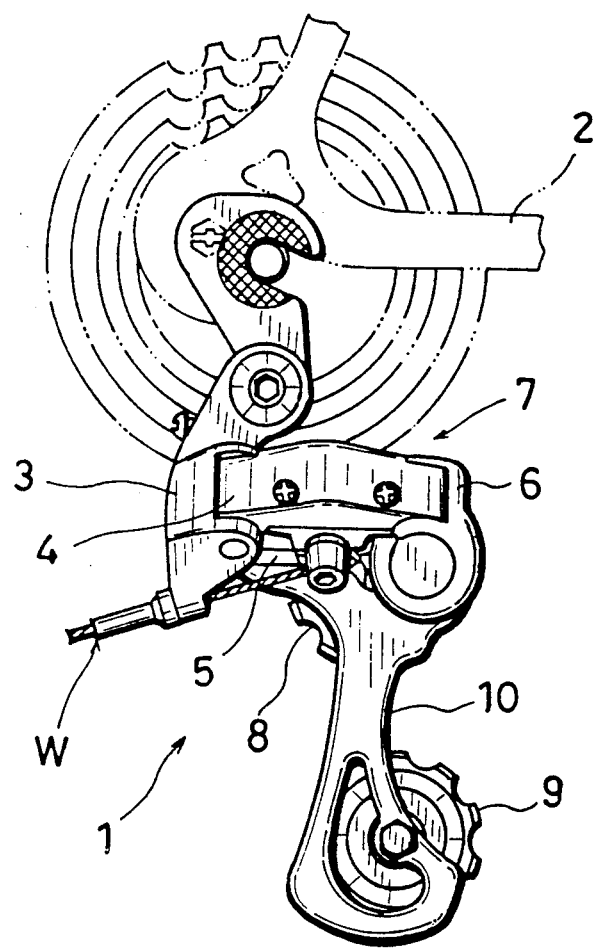
FIG. 6 is a side view showing an entire configuration of a derailleur according to the present invention.

Referring now to FIGS. 1 and 6, a rear derailleur 1 according to the present invention has a parallelogram pantograph link mechanism 7 which comprises: a base member 3 which is mounted to a bicycle frame 2; a parallel pair of a first and second link members 4 and 5, each having a base end portion pivoted by respective connecting pins 11a, 11b to the base member 3; and a movable member 11 pivotally connected by connecting pins 11e, 11f to each free end portion of the first and second link members 4, 5. On the movable member 6, a chain guide 10, which rotatably supports a guide pulley 8 and a tension pulley 9, is rotatably supported. The speed shift operation is performed by causing the parallelogram pantograph link mechanism 7 to move the chain guide 10 laterally of the bicycle.

When a control cable W connected to the parallelogram pantograph link mechanism 7 is pulled to deform the parallelogram pantograph link mechanism 7, the chain guide 10 is moved axially of a hub shaft to shift the chain from one to another sprocket for a different bicycle speed.

Figure 3:
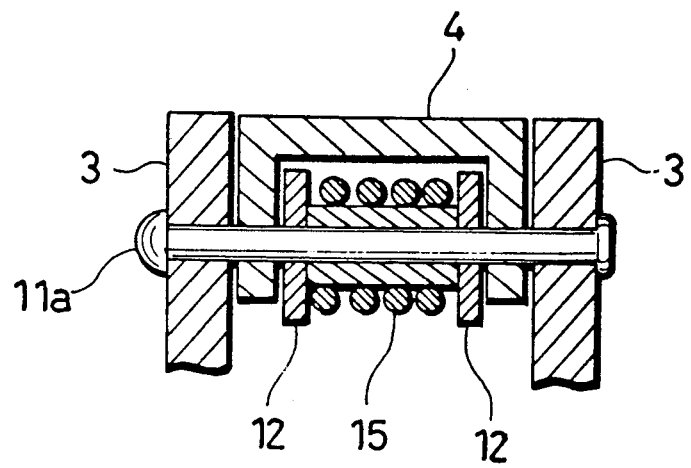
FIG. 3 is a cross-sectional view taken on the line III—III of FIG. 1.

Now, as shown in FIG. 1, in the derailleur 1 according to the present embodiment, the parallelogram pantograph link mechanism 7 is provided with: a first pivotal member 12, which is pivoted at its one end to the connecting pin 11a which connects the base member 3 and the first link member 4, being oriented inwardly of the parallelogram pantograph link mechanism; and a second pivotal member 13, which is pivoted at its one end to the connecting pin 11b which is provided at a predetermined position of an intermediate portion of the second link member 5. Another end portion of each of the first and second pivotal members 12, 13 is mutually connected by a connecting pin 11c. Hence, the first and second pivotal members 12, 13, the base member 3, and a portion 5a of the second link member 5 between the connecting pins 11b and 11d forms an irregular quadrilateral (trapeziform) link mechanism 14 which is an additional link mechanism being a different link mechanism from the parallelogram pantograph link mechanism 7. Between the first pivotal member 12 and the base member 3, there is provided a return spring 15, as shown in FIGS. 1 and 3, with its end portions respectively contacting the base member 3 and the first pivotal member 12 thereby elastically urging the first pivotal member 12 in a clockwise direction as in FIG. 1.

Figure 2:
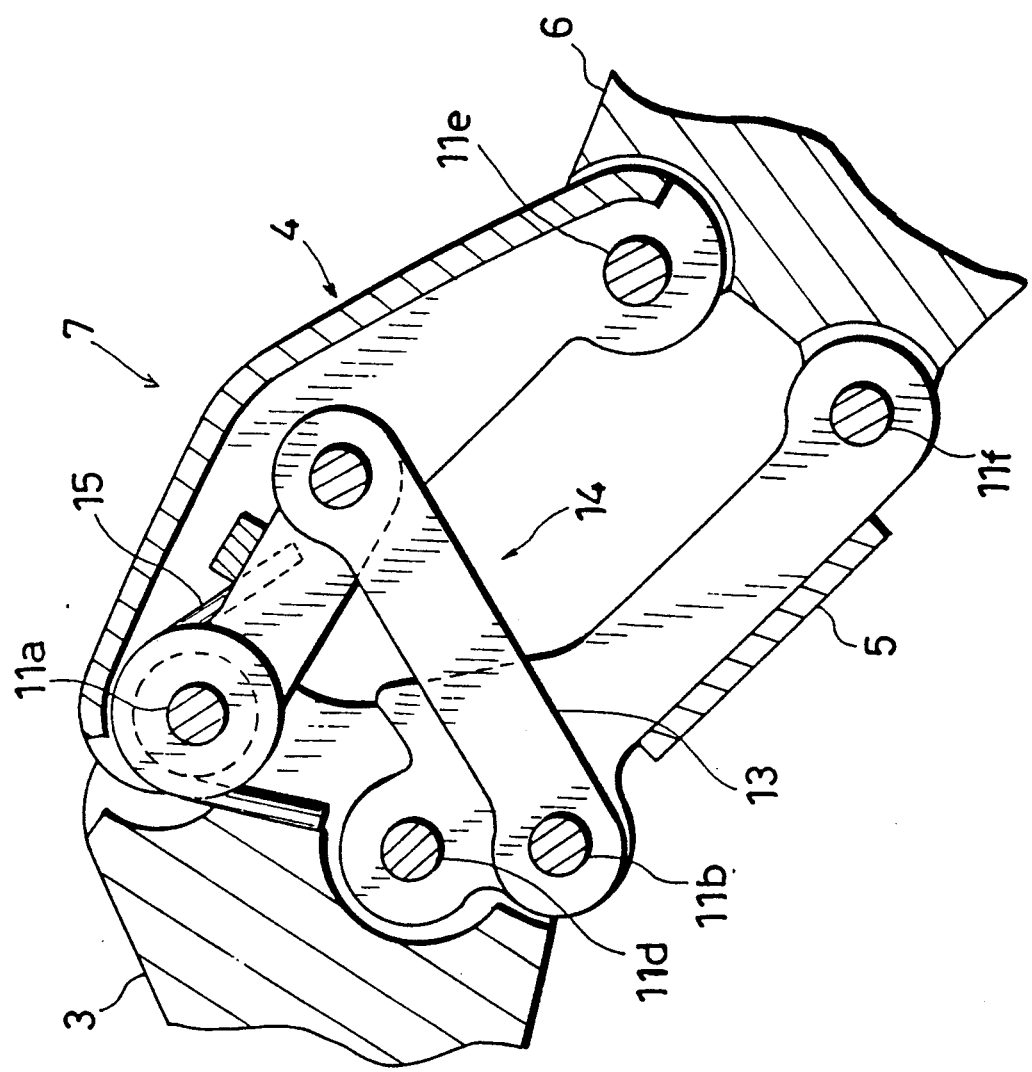
FIG. 2 is a cross-sectional view showing a deformed state of the link mechanism of FIG. 1.

When the parallelogram pantograph link mechanism 7 is deformed by the control cable W, the additional link mechanism 14 correspondingly deforms as shown in FIG. 2 causing the first and second pivotal member 12, 13 to make relative pivotal movement against each constituent member of the parallelogram pantograph link mechanism 7.

Figure 4:
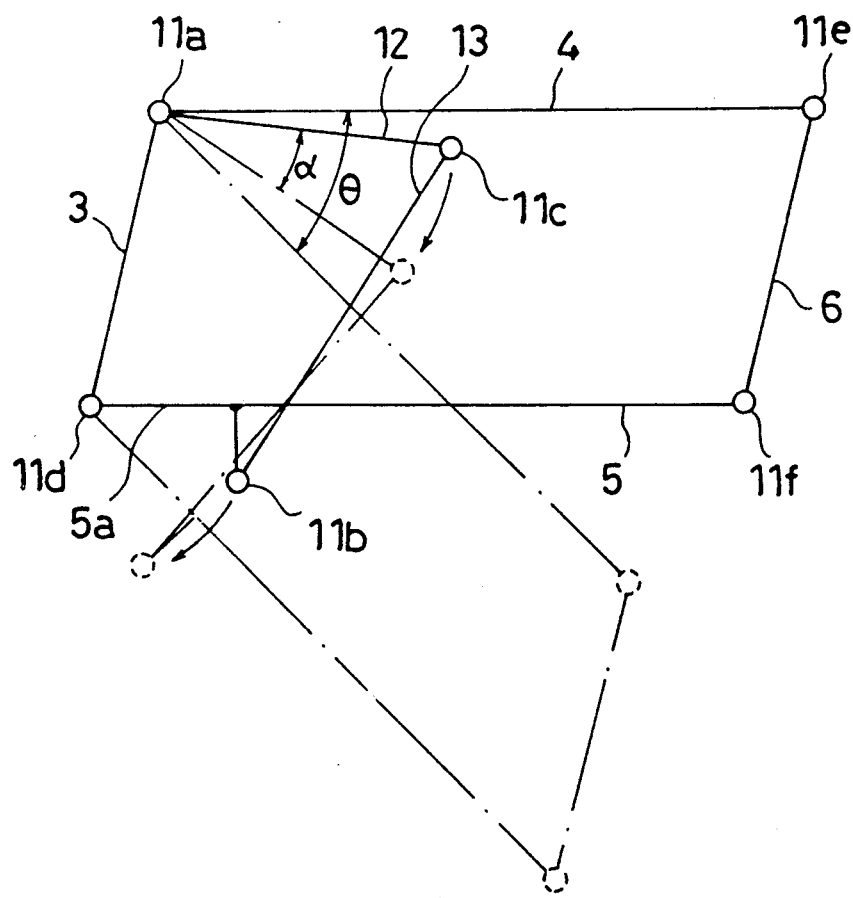
FIG. 4 is a schematic drawing to show a state of change in the link mechanism as depicted in FIGS. 1 and 2.

FIG. 4 shows a schematic diagram of the link mechanism according to FIG. 1.

As will be understood from FIG. 4, the rear derailleur according to the present embodiment has the parallelogram pantograph link mechanism 7 formed by the base member 3, the first and second link members 4, 5, and the movable member 6, and in addition to this, there is formed a trapeziform link mechanism 14 comprising the base member 3, the first and second pivotal members 12, 13, and the portion 5a between the connecting pin 11b of the second link member 13 and the connecting pin 11d. This trapeziform link mechanism 14 deforms correspondingly as the parallelogram pantograph link mechanism 7 deforms, and at the same time, the built-in return spring 15 provides the parallelogram pantograph link mechanism 7 with elastic returning force.

In the trapeziform link mechanism 14 according to the present embodiment, the first pivotal member has a greater length than the portion 5a which is a portion between the connecting pins 11b and 11d of the second link member 5. As a result, referring to FIG. 4, when the parallelogram pantograph link mechanism 7 is pivoted to deform from a state depicted in solid lines to a state depicted in phantom lines, a pivotal angle $\alpha$, which is an angle made by the relative pivotal movement of the first pivotal member 12 against the base member 3, is smaller than a pivotal angle $\theta$ which is an angle made by the pivotal movement of the first link member 4 or the second link member 5 against the base member 3.

Since the return spring 15 is placed between the base member 3 and the first pivotal member 12, it is obvious that the amount of contraction $a$ of the return spring 15 is substantially smaller than in the conventional arrangement where the return spring is placed between the base member 3 and the first link member 4.

To elaborate on this point, the spring force from the return spring 15, in this embodiment, is transmitted by the trapeziform link mechanism 14 to the parallelogram pantograph link mechanism 7, and the parallelogram pantograph link mechanism 7 is deformed against this particular spring force. Accordingly, with the momentum transmission efficiency from the trapeziform link mechanism 14 to the pantograph link mechanism 7 being equal, it is possible, by using the decrease in contraction of the return spring 15, to reduce the difference in the elastic returning force before and after the deformation of the parallelogram pantograph link mechanism 7.

Hence, it is now possible to give a control lever assembly a smaller amount of friction resistance to hold the control cable W against the elastic pulling force by the return spring 15. Thus, the rotational resistance of the control lever may be reduced for improved speed shift operatability and decreased size and weight in the derailleur and the control lever assembly.

Figure 5:
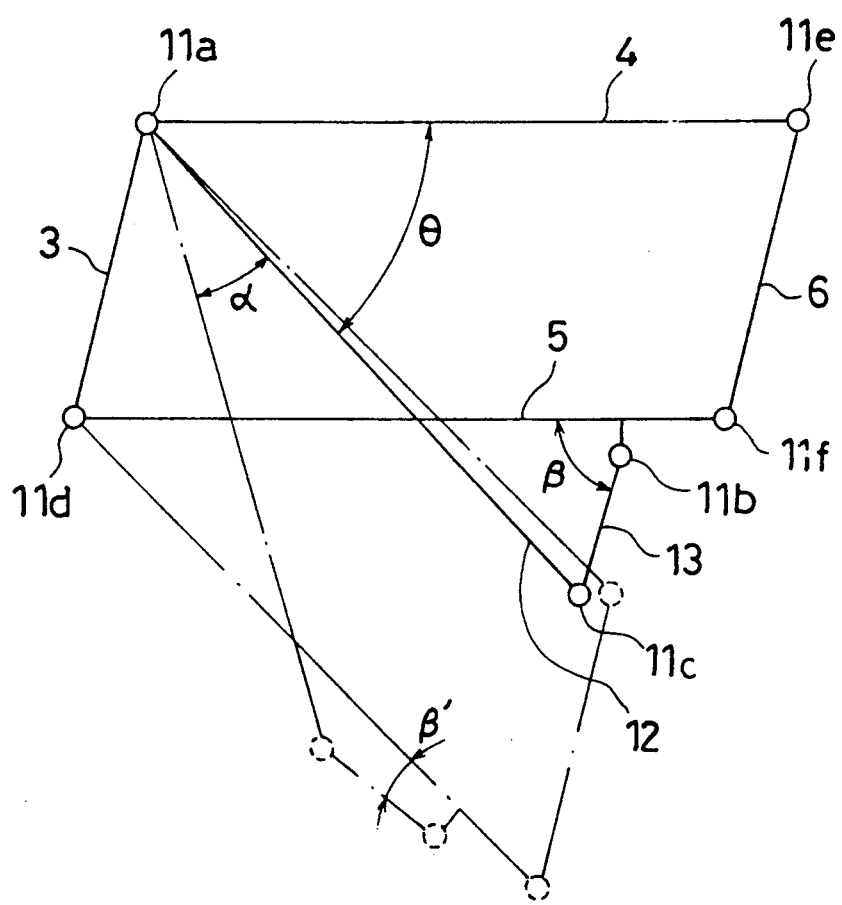
FIG. 5 is a schematic drawing to show a second embodiment of the present invention.

FIG. 5 shows a second embodiment of a derailleur according to the present invention.

In this embodiment, the first pivotal member 12 is pivoted, in the same way as in the first embodiment, to the connecting pin 11a which connects the first link member 4 and the base member 3, and the return spring 15 is placed between this first pivotal member 12 and the base member. On the other hand, an end of the second pivotal member 13 is pivoted to the connecting pin 11b which is provided at a free-end side of an intermediate portion of the second link member 5 whereas respective ends of the first and second pivotal members 12, 13 are connected by the pin 11c.

As shown in FIG. 5, the length and the connecting position of the first and second pivotal members 12, 13 are set so that an angle $\beta$ formed by the second link member 5 and the second pivotal member 13 before the link mechanism's deformation has a relatively great value whereas an angle $\beta'$ formed by the second link member 5 and the second pivotal member 13 after the link mechanism's deformation is smaller.

Now, a link mechanism, in general, can only transmit force in a longitudinal direction. Therefore, when the angle $\beta'$ formed by the second link member 5 and the second pivotal member 13 becomes smaller as described above, most of the force transmitted by the second pivotal member 13 is shifted in a longitudinal direction of the second link member 5.

This means that a momentum from the return spring 15 to pivot the second link member 5 decreases as the angle formed by the second link member 5 and the second pivotal member 13 becomes smaller. As a result, the amount of force necessary to maintain the parallelogram pantograph link mechanism 7 at the deformed state also decreases. In other words, the additionally formed link mechanism 14 can change the transmission efficiency of the momentum from the return spring 15 to the parallelogram pantograph link mechanism 7.

In the embodiment shown in FIG. 5, the amount of contraction $\alpha$ of the return spring 15 is smaller than the pivotal movement angle $\theta$ of the first link member 4, and furthermore it is possible to reduce the momentum transmission efficiency of the elastic force from the return spring 15 to the parallelogram pantograph link mechanism. Accordingly, it is possible to average the elastic returning force before and after deformation of the parallelogram pantograph link mechanism 7. This means that it is now possible to average the necessary force to pull the control cable W over the entire deformation range of the parallelogram pantograph link mechanism 7.

As a result, the amount of force necessary to operate the control lever is also averaged, enabling increased speed shift operatability and decreased size and weight of both derailleur and the control lever assembly as has been mentioned in the first embodiment.

As may have been fully understood from the embodiments described hereinabove, in a bicycle derailleur according to the present invention, the length and the connecting position of each of the two pivotal members may be selected so that the first or second pivotal member has a smaller pivotal movement relative to the deformation of the parallelogram pantograph link mechanism, or so that these pivotal members form varied angles with their respective members to which they are connected. Thus, it is possible to reduce the amount of the return spring's contraction and/or to vary the momentum transmission efficiency of the elastic force of the return spring to the parallelogram pantograph link mechanism, thereby reducing or averaging the difference in the elastic returning force between the starting and ending phases of the parallelogram pantograph link mechanism's deformation.

Therefore, it is possible to reduce or average variation in the required force to operate the control lever, thereby improving the speed shift operatability while reducing the size and weight of the derailleur and the control lever assembly.

The scope of the present invention is not limited to what is described in the embodiments hereinabove.

For example, in the embodiments, the first pivotal member 12 is pivoted to the connecting pin 11a which connects the base member 3 to the first link member 4, and the second pivotal member 13 is pivoted at a predetermined position of an intermediate portion of the second link member 5; however, the first and the second pivotal member 12, 13 may be pivoted to other members.

The length of the first and second pivotal members 12, 13 may not be limited to those selected in the embodiments, and may be varied according to the elastic returning force, for example, of the parallelogram pantograph link mechanism.

Likewise, the arrangement used in the embodiments where the amount of contraction of the return spring 15 becomes smaller than in the conventional case, may even be altered so as to increase the contraction of the return spring 15; even in that type of arrangement, it is possible to achieve the same functions by relying only on the decreased transmission efficiency of the momentum from the additional link mechanism 14 including the first and the second pivotal members 12, 13 to the parallelogram pantograph link mechanism 7.

Another variation may include an application of the present invention to a front derailleur instead of a rear derailleur as applied in the embodiments.

Further, the return spring 15, which is placed between the base member 3 and the first pivotal member 12, may be placed elsewhere, for instance, between the first and second pivotal members 12 and 13.

I claim:

1. A bicycle derailleur comprising:
   a parallelogram pantograph link mechanism including a base member mounted to a bicycle frame, a parallel pair of link members each having a base end pivoted by a connecting pin to the base member, and a movable member pivoted by connecting pins to respective free ends of the link members; and
   a chain guide rotatably supporting a guide pulley and a tension pulley, the chain guide being moved laterally of the bicycle by the parallelogram pantograph link mechanism for speed change operation: wherein
   the parallelogram pantograph link mechanism is provided with a first and a second pivotal members each having a predetermined length and pivoted to a predetermined position of a different constituent member of the parallelogram pantograph link mechanism, respective free ends of the first and second pivotal members being mutually connected by a pin for causing the first and second pivotal members to pivot relative to the member to which they are pivoted when the parallelogram pantograph link mechanism is deformed; and
   a return spring is provided between the first or second pivotal member and a selected one of the constituent members of the parallelogram pantograph.

2. The bicycle derailleur according to claim 1, wherein the length and connecting position of each of the first and second pivotal members are set so that, when the pantograph link mechanism is deformed, the relative pivotal movement between the members which are directly acted by the return spring is smaller than the pivotal movement between the respective constituent members of the pantograph link mechanism.

3. The bicycle derailleur according to claim 2, wherein the return spring is provided between the first pivotal member and the base member.

4. The bicycle derailleur according to claim 2, wherein the return spring is provided between the first and second pivotal members.

5. The bicycle derailleur according to claim 1, wherein the length and the connecting position of each of the first and second pivotal members are set so that a link mechanism including the first and second pivotal members transmits its momentum to the pantograph link mechanism at a decreased transmission efficiency.

6. The bicycle derailleur according to claim 5, wherein the length and connecting position of each of the first and second pivotal members are set so that an angle formed between the second pivotal member and a second one of the link members to which the second pivotal member is connected becomes smaller as the pantograph link mechanism is deformed.

7. The bicycle derailleur according to claim 1, wherein an end of the first pivotal member is pivotally connected to the connecting pin which connects the base member to a first one of the link members while an end of the second pivotal member is pivoted by a connecting pin to an intermediate portion of a second one of the link members.

8. The bicycle derailleur according to claim 1, wherein the said bicycle derailleur is a rear derailleur.

9. The bicycle derailleur according to claim 1, wherein the said bicycle derailleur is a front derailleur.

* * * * *